United States Patent
Ito et al.

(10) Patent No.: US 11,149,143 B2
(45) Date of Patent: Oct. 19, 2021

(54) RESIN COMPOSITION, METHOD FOR PRODUCING SAME AND MULTI-LAYERED STRUCTURE USING SAME

(71) Applicant: KURARAY CO., LTD., Kurashiki (JP)

(72) Inventors: Yu Ito, Kurashiki (JP); Makoto Suzuki, Kurashiki (JP); Makoto Okamoto, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 2 days.

(21) Appl. No.: 16/631,202

(22) PCT Filed: Jul. 23, 2018

(86) PCT No.: PCT/JP2018/027466
§ 371 (c)(1),
(2) Date: Jan. 15, 2020

(87) PCT Pub. No.: WO2019/021996
PCT Pub. Date: Jan. 31, 2019

(65) Prior Publication Data
US 2020/0216658 A1 Jul. 9, 2020

(30) Foreign Application Priority Data
Jul. 24, 2017 (JP) .............................. JP2017-143129

(51) Int. Cl.
| | |
|---|---|
| *C08L 51/06* | (2006.01) |
| *C08L 51/00* | (2006.01) |
| *B32B 1/02* | (2006.01) |
| *B32B 27/08* | (2006.01) |
| *B32B 27/30* | (2006.01) |
| *B32B 27/32* | (2006.01) |
| *B32B 27/20* | (2006.01) |
| *B60K 15/03* | (2006.01) |

(52) U.S. Cl.
CPC ................ *C08L 51/06* (2013.01); *B32B 1/02* (2013.01); *B32B 27/08* (2013.01); *B32B 27/20* (2013.01); *B32B 27/306* (2013.01); *B32B 27/32* (2013.01); *B32B 2250/03* (2013.01); *B32B 2250/246* (2013.01); *B32B 2307/308* (2013.01); *B32B 2307/558* (2013.01); *B32B 2439/00* (2013.01); *B32B 2605/08* (2013.01); *B60K 15/03177* (2013.01); *C08L 51/003* (2013.01); *C08L 2205/025* (2013.01)

(58) Field of Classification Search
CPC .......... C08L 51/06; C08L 23/12; C08L 23/06; C08L 23/0861; C08L 51/003; C08L 2205/025; C08L 2205/035
See application file for complete search history.

(56) References Cited

U.S. PATENT DOCUMENTS

| | | |
|---|---|---|
| 6,033,749 A | 3/2000 | Hata et al. |
| 2006/0099365 A1 | 5/2006 | Sasai et al. |
| 2013/0225756 A1 | 8/2013 | Igarashi et al. |
| 2013/0244010 A1 | 9/2013 | Hasegawa et al. |
| 2016/0229987 A1 | 8/2016 | Kawai et al. |

FOREIGN PATENT DOCUMENTS

| | | |
|---|---|---|
| CN | 103221440 A | 7/2013 |
| JP | 61-141744 A | 6/1986 |
| JP | 9-29904 A | 2/1997 |
| JP | 2006-151365 A | 6/2006 |
| JP | 2011-252101 A | 12/2011 |
| WO | WO 2012/060371 A1 | 5/2012 |
| WO | WO 2015/041258 A1 | 3/2015 |

OTHER PUBLICATIONS

International Search Report dated Oct. 23, 2018 in PCT/JP2018/027466 filed on Jul. 23, 2018, 2 pages.
The First Office Action dated Jul. 29, 2019 in Chinese Patent Application No. 201880003446. 6 (with unedited computer-generated English translation), 8 pages.

*Primary Examiner* — Jeffrey C Mullis
(74) *Attorney, Agent, or Firm* — Oblon, McClelland, Maier & Neustadt, L.L.P.

(57) ABSTRACT

A resin composition (E) includes from 0.1 to 20 parts by mass of an ethylene-vinyl alcohol copolymer (B), from 0.1 to 20 parts by mass of an acid-modified polyolefin (C), and from 0.1 to 10 parts by mass of an acid-modified polyolefin (D) based on 100 parts by mass of a polyolefin (A), wherein the polyolefin (A) has an MFR (190° C., under a load of 2.16 kg) from 0.01 to 10 g/10 min, the acid-modified polyolefin (C) has an acid value from 0.1 to 9 mg KOH/g, the acid-modified polyolefin (D) has an acid value of more than 10 mg KOH/g and 120 mg KOH/g or less, and a ratio (D/A) of an MFR (190° C., under a load of 2.16 kg) of the acid-modified polyolefin (D) to the MFR (190° C., under a load of 2.16 kg) of the polyolefin (A) is 50 or more. The resin composition (E) of the present invention causes reduction in the amount of deteriorated materials adhering to a screw and/or a die even when long-term continuous melt molding is conducted. Use of the resin composition (E) also allows production of a molded article exhibiting excellent impact resistance and appearance. The production method of the present invention allows long-term stable production of the resin composition (E).

6 Claims, 1 Drawing Sheet

US 11,149,143 B2

RESIN COMPOSITION, METHOD FOR PRODUCING SAME AND MULTI-LAYERED STRUCTURE USING SAME

TECHNICAL FIELD

The present invention relates to a resin composition containing a polyolefin and an ethylene-vinyl alcohol copolymer and a method for producing the same. The present invention also relates to a multilayer structure using the resin composition. Moreover, the present invention relates to a recycling agent used for production of the resin composition and the like.

BACKGROUND ART

Conventionally, a multilayered-structure including a polyolefin layer and an ethylene-vinyl alcohol copolymer (hereinafter, an ethylene-vinyl alcohol copolymer may be abbreviated as "an EVOH") layer exhibiting excellent barrier properties has been used for various types of use, such as a food packaging container and a fuel container, taking advantage of its barrier property. Such a multilayer structure is used as various molded articles, such as a film, a sheet, a cup, a tray, and a bottle. Here, depending on the case, scraps and defective products generated during production of such a molded article are recovered and melt molded to be reused as at least one layer in a multilayer structure comprising a polyolefin layer and an EVOH layer. Such a recovery technique is useful in the light of waste reduction and economic efficiency, and thus employed in extensive applications.

However, when a regrind of a multilayer structure comprising a polyolefin layer and an EVOH layer is reused, long-term continuous melt molding is difficult because thermal deterioration during melt molding causes gelation and/or deteriorated materials adhere to the inside of an extruder. Moreover, there is a problem that contamination of a molded article with such deteriorated materials causes worsening of an appearance. Furthermore, a multilayer structure having a resin composition layer containing such a regrind may have insufficient impact resistance. These problems become more significant as reuse of the regrind of the multilayer structure is repeated. Among all, fuel containers mounted on an automobile and the like must be highly impact resistant for ensuring safety. Given the situation, improvement of impact resistance is strongly needed.

For the purpose of solving such problems, various techniques are developed. Patent Document 1 describes a mixed resin comprising polyolefin (A), a saponified ethylene-vinyl acetate copolymer (B), and an acid-modified olefin-carboxylic acid vinyl ester copolymer (C), wherein an olefin content of the acid-modified olefin-carboxylic acid vinyl ester copolymer (C) is from 50 to 95 mol %, and a difference between an ethylene content of the saponified ethylene-vinyl acetate copolymer (B) and the olefin content of the acid-modified olefin-carboxylic acid vinyl ester copolymer (C) is within the range of 20 to 70 mol %. Patent Document 1 describes that the use of the mixed resin allows for providing a molded article in which fish eyes, stripes and/or streaks are reduced, with the amount of deteriorated materials adhering to a screw, even in long-term continuous melt molding. In Examples in Patent Document 1, there is described a mixed resin prepared by adding a maleic anhydride modified ethylene-vinyl acetate copolymer with an acid modification amount from 0.03 to 0.33 mmol/g and a melt index from 12.4 to 18.2 g/10 min (190° C., under a load of 2160 g) and a pigment to a regrind obtained by pulverizing a multilayer structure including a polypropylene layer with a melt index of 1.4 g/10 min (230° C., under a load of 2160 g), an adhesive resin layer, and a saponified ethylene-vinyl acetate copolymer layer. However, when the mixed resin is subjected to long-term continuous melt molding, there still remain the problems that deteriorated materials may adhere to a screw and/or a die, and a molded article to be obtained may be insufficiently impact resistant.

Patent Document 2 describes a fuel container where high-density polyethylene (a) layers are disposed over the inner and outer sides of the ethylene-vinyl alcohol copolymer (c) layer via an adhesive resin (b) layer, and a thickness ratio (I/O) is less than 50/50, where a total thickness of the layers positioned inside of the (c) layer is "I", and a total thickness of the layers positioned outside of the (c) layer is "O". In Examples in Patent Document 2, it is described that a multilayer fuel container having a three-material five-layer (high-density polyethylene/maleic anhydride modified polyethylene/ethylene-vinyl alcohol copolymer/maleic anhydride modified polyethylene/high-density polyethylene) structure is pulverized, pelletized, and supplied for reuse. However, when a multilayer fuel container having a resin composition layer containing such pellets is subjected to long-term continuous molding, impact resistance may be insufficient.

PRIOR ART DOCUMENTS

Patent Documents

Patent Document 1: WO 2012/060371
Patent Document 2: JP 9-29904 A

SUMMARY OF THE INVENTION

Problems to be Solved by the Invention

The present invention has been made to solve the above problems, and it is an object thereof to provide a resin composition allowing production of a molded article that contains a polyolefin and an ethylene-vinyl alcohol copolymer, causes reduction in the amount of deteriorated materials adhering to a screw and/or a die even when long-term continuous melt molding is conducted, and exhibits excellent impact resistance and appearance. It is also an object thereof to provide a method for producing the resin composition, a multilayer structure using the resin composition, and a recycling agent preferably used to produce the resin composition and the like.

Means for Solving the Problems

The above problems are solved by providing a resin composition (E) comprising from 0.1 to 20 parts by mass of an ethylene-vinyl alcohol copolymer (B), from 0.1 to 20 parts by mass of an acid-modified polyolefin (C), and from 0.1 to 10 parts by mass of an acid-modified polyolefin (D) based on 100 parts by mass of a polyolefin (A), wherein the polyolefin (A) has an MFR (190° C., under a load of 2.16 kg) from 0.01 to 10 g/10 min, the acid-modified polyolefin (C) has an acid value from 0.1 to 9 mg KOH/g, the acid-modified polyolefin (D) has an acid value of more than 10 mg KOH/g and 120 mg KOH/g or less, and a ratio (D/A) of an MFR (190° C., under a load of 2.16 kg) of the acid-modified polyolefin (D) to the MFR (190° C., under a load of 2.16 kg) of the polyolefin (A) is 50 or more.

A preferred embodiment of the present invention is a method for producing the resin composition (E), comprising: melt kneading a regrind of a multilayer structure comprising a layer of the polyolefin (A), a layer of the ethylene-vinyl alcohol copolymer (B), and a layer of the acid-modified polyolefin (C); and a recycling agent containing the acid-modified polyolefin (D).

Another preferred embodiment of the present invention is a multilayer structure comprising: a layer of the resin composition (E); a layer of the polyolefin (A); a layer of the ethylene-vinyl alcohol copolymer (B); and a layer of the acid-modified polyolefin (C).

Still another preferred embodiment of the present invention is a fuel container comprising a layer of the resin composition (E). It is preferred that the fuel container further comprises: a layer of the polyolefin (A); a layer of the ethylene-vinyl alcohol copolymer (B); and a layer of the acid-modified polyolefin (C), wherein the (A) layer or a layer of the resin composition (E) is disposed over the inner and outer sides of the (B) layer via the (C) layer. In this situation, it is more preferred that a thickness ratio (I/O) is less than 50/50, where a total thickness of the layers positioned inside of the layer of the ethylene-vinyl alcohol copolymer (B) is "I" and a total thickness of the layers positioned outside of the (B) layer is "0", and a thickness ratio (X/Y) satisfies a formula (1) below, where a thickness of the (B) layer is "X" and an entire thickness is "Y":

$$0.005 \leq (X/Y) \leq 0.13 \tag{1}.$$

The above problems are also solved by providing a recycling agent comprising a polyolefin (A) and an acid-modified polyolefin (D), wherein a mass ratio (D/A) of the acid-modified polyolefin (D) to the polyolefin (A) is from 0.1 to 10, the polyolefin (A) has an MFR (190° C., under a load of 2.16 kg) from 0.01 to 10 g/10 min, the acid-modified polyolefin (D) has an acid value of more than 10 mg KOH/g and 120 mg KOH/g or less, and a ratio (D/A) of an MFR (190° C., under a load of 2.16 kg) of the acid-modified polyolefin (D) to the MFR (190° C., under a load of 2.16 kg) of the polyolefin (A) is 50 or more.

Effects of the Invention

The resin composition (E) of the present invention causes reduction in the amount of deteriorated materials adhering to a screw and/or a die even when long-term continuous melt molding is conducted. Moreover, use of the resin composition (E) allows production of a molded article exhibiting excellent impact resistance and appearance. The production method of the present invention allows long-term stable production of the resin composition (E). Use of the recycling agent of the present invention also allows long-term stable production of the resin composition (E). The multilayer structure obtained using the resin composition (E) exhibits excellent impact resistance and appearance, causing less production of stripes and the like.

MODES FOR CARRYING OUT THE INVENTION

Figure 1:
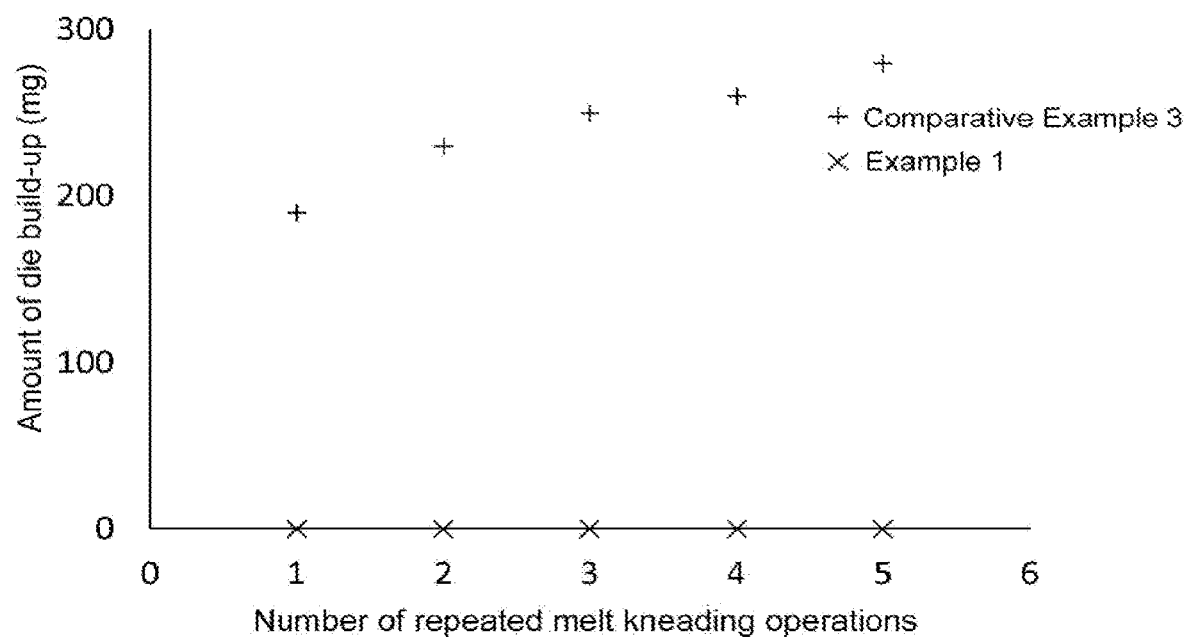
FIG. 1 is a plot of the amount of die build-up vs. the number of repeated melt kneading operations in Example 1 and Comparative Example 3.

A resin composition (E) of the present invention includes from 0.1 to 20 parts by mass of an ethylene-vinyl alcohol copolymer (B), from 0.1 to 20 parts by mass of an acid-modified polyolefin (C), and from 0.1 to 10 parts by mass of an acid-modified polyolefin (D) based on 100 parts by mass of a polyolefin (A), wherein the polyolefin (A) has an MFR (190° C., under a load of 2.16 kg) from 0.01 to 10 g/10 min, the acid-modified polyolefin (C) has an acid value from 0.1 to 9 mg KOH/g, the acid-modified polyolefin (D) has an acid value of more than 10 mg KOH/g and 120 mg KOH/g or less, and a ratio (D/A) of an MFR (190° C., under a load of 2.16 kg) of the acid-modified polyolefin (D) to the MFR (190° C., under a load of 2.16 kg) of the polyolefin (A) is 50 or more.

The polyolefin (A) contained in the resin composition (E) has to have an MFR (190° C., under a load of 2.16 kg) from 0.01 to 10 g/10 min. If the MFR of the polyolefin (A) is less than 0.01 g/10 min, a difference in melt viscosity between the EVOH (B) and the polyolefin (A) is so large that the EVOH (B) is not sufficiently dispersed in the resin composition (E), and thus a molded article to be obtained may have insufficient impact resistance. Meanwhile, if the MFR of the polyolefin (A) is more than 10 g/10 min, a molded article to be obtained may have insufficient impact resistance. The MFR is preferably 5 g/10 min or less, more preferably 3 g/10 min or less, and even more preferably 2 g/10 min or less. In the light of obtaining a molded article with particularly excellent impact resistance, the MFR of the polyolefin (A) is preferably 0.8 g/10 min or less, more preferably 0.4 g/10 min or less, and even more preferably 0.1 g/10 min or less. In the present invention, the MFRs of the resins are measured in accordance with JIS K 7210. In the present invention, an MFR of a resin having a melting point around 190° C. or higher than 190° C. is determined by a method that under a load of 2160 g, an MFR is measured at multiple temperatures equal to or higher than the melting point, and the measured values are plotted in a single logarithmic chart with a horizontal axis of an inverse of an absolute temperature and a vertical axis of a logarithm of an MFR, and an extrapolated value to 190° C. is used. In the present invention, when the polyolefin (A) is a mixture of multiple types of resins, the MFR of the polyolefin (A) is determined by weighted averaging MFRs of the individual resins with a mixing mass ratio. Likewise, when the EVOH (B), the acid-modified polyolefin (C) or the acid-modified polyolefin (D) is a mixture of multiple types of resins, an MFR of each material is determined as described for the polyolefin (A).

Examples of the polyolefin (A) include: polypropylene; propylene-based copolymers produced by copolymerizing propylene with an α-olefin, such as ethylene, 1-butene, 1-hexene, and 4-methyl-1-pentene; polyethylenes such as low-density polyethylene, straight-chain low-density polyethylene, medium-density polyethylene, and high-density polyethylene; ethylenic copolymers produced by copolymerizing ethylene with an α-olefin such as 1-butene, 1-hexene, and 4-methyl-1-pentene, and poly(l-butene), poly(4-methyl-1-pentene), and the like. The polyolefin (A) can be used alone or in combination of two or more. Among these, the polyolefin (A) is preferably a polypropylene-based resin, such as polypropylene and a propylene-based copolymer, or a polyethylene-based resin, such as polyethylene and an ethylenic copolymer. From the perspective of obtaining a molded article exhibiting excellent heat resistance, the polyolefin (A) is preferably a polypropylene-based resin and more preferably polypropylene. Meanwhile, from the perspective of obtaining a molded article exhibiting excellent impact resistance, the polyolefin (A) is preferably a polyethylene-based resin, more preferably polyethylene, and even more preferably high-density polyethylene.

The EVOH (B) contained in the resin composition (E) can be produced by saponifying an ethylene-vinyl ester copolymer. Typically, the vinyl ester is vinyl acetate, but other fatty acid vinyl esters (vinyl propionate, vinyl pivalate, and so on) can also be used. An ethylene content in the EVOH (B) is preferably from 20 to 60 mol %. If the ethylene content is less than 20 mol %, thermal stability of the EVOH (B) in the resin composition (E) may be lowered. The ethylene content is more preferably 23 mol % or more. If the ethylene content is more than 60 mol %, barrier properties may be reduced. The ethylene content is more preferably 55 mol % or less and even more preferably 50 mol % or less. Meanwhile, the vinyl ester units in the EVOH (B) preferably have a degree of saponification of 80% or more, more preferably 98% or more, and even more preferably 99% or more in the light of barrier properties. An ethylene content and a degree of saponification in the EVOH (B) can be determined by nuclear magnetic resonance (NMR) spectroscopy.

In the EVOH (B), polymerizable monomers other than ethylene and a vinyl ester may be copolymerized, as long as they do not inhibit the effects of the present invention, generally within the range of 5 mol % or less. Examples of such a polymerizable monomer include: α-olefins, such as propylene, 1-butene, 1-hexene, and 4-methyl-1-pentene; (meth)acrylates; alkyl vinyl ethers; N-(2-dimethylaminoethyl)methacrylamide or its quaternized derivatives; N-vinylimidazole or its quaternized derivatives; N-vinylpyrrolidone; N,N-butoxymethylacrylamide; vinyltrimethoxysilane; vinylmethyldimethoxysilane; vinyldimethylmethoxysilane; and the like.

The EVOH (B) used in the present invention preferably has an MFR (melt flow rate) (measured at 210° C., under a load of 2160 g) from 0.1 to 100 g/10 min. If the MFR of the EVOH (B) is more than 100 g/10 min, a difference in melt viscosity between the EVOH (B) and the acid-modified polyolefin (C) is so large that the EVOH (B) may not be sufficiently dispersed in the resin composition (E), leading to a decrease in thermal stability. The MFR of the EVOH (B) is more preferably 50 g/10 min or less and even more preferably 30 g/10 min or less. Meanwhile, if the MFR of the EVOH (B) is less than 0.1 g/10 min, a difference in viscosity between the EVOH (B) and the acid-modified polyolefin (D) is so large that the EVOH (B) may be insufficiently dispersed in the resin composition (E), leading to insufficient impact resistance. The MFR is more preferably 0.5 g/10 min or more.

The content of the EVOH (B) in the resin composition (E) is from 0.1 to 20 parts by mass based on 100 parts by mass of the polyolefin (A). If the content of the EVOH (B) is more than 20 parts by mass, fouling on a screw and/or a die increases during melt kneading of the resin composition (E), and impact resistance of a molded article to be obtained decreases. The content is preferably 15 parts by mass or less. Meanwhile, if the content of the EVOH (B) is less than 0.1 part by mass, problems such as fouling on a screw and/or a die due to the EVOH (B) and a decrease in impact resistance are less likely to occur, and therefore, the present invention is less beneficial. The content is preferably 1 part by mass or more.

Examples of the acid-modified polyolefin (C) contained in the resin composition (E) include a graft-modified polyolefin produced by graft modifying a polyolefin with an acid, and an olefinic copolymer produced by copolymerizing an olefin with an acid. These can be used alone or in combination of two or more. Among these, a graft-modified polyolefin is suitable as the acid-modified polyolefin (C). In the light of higher compatibility with the polyolefin (A), the acid-modified polyolefin (C) is preferably obtained by acid-modifying the same type of polyolefin as the polyolefin (A). For example, when the polyolefin (A) is polypropylene, the acid-modified polyolefin (C) is preferably acid-modified polypropylene. When the polyolefin (A) is polyethylene, the acid-modified polyolefin (C) is preferably acid-modified polyethylene.

The graft-modified polyolefin used as the acid-modified polyolefin (C) may be that obtained by graft modifying the above polyolefin used as the polyolefin (A) with an acid. The acid for grafting onto polyolefin can be an unsaturated carboxylic acid or its derivative such as acrylic acid, methacrylic acid, fumaric acid, itaconic acid, maleic acid, maleic anhydride, and itaconic anhydride. Among these, a maleic-anhydride graft-modified polyolefin is most suitable.

The olefinic copolymer used as the acid-modified polyolefin (C) may be that obtained by copolymerizing an acid as a copolymerization component with the above polyolefin used as the polyolefin (A). The acid used may be those mentioned as an acid which is grafted onto polyolefin.

The acid-modified polyolefin (C) has an acid value from 0.1 to 9 mg KOH/g. The acid-modified polyolefin (C) having such an acid value exhibits excellent in adhesiveness to the polyolefin (A) and the EVOH (B), and is, therefore, used as an adhesion layer in a multilayer structure having a layer of the polyolefin (A) and a layer of the EVOH (B). It is generally contained in the resin composition (E) when the resin composition (E) is produced using a regrind of such a multilayer structure. The acid-modified polyolefin (C) contained in the resin composition (E) improves dispersibility of the EVOH (B) in the resin composition (E) and thus improves impact resistance of a molded article to be obtained. If the acid-modified polyolefin (C) has an acid value of less than 0.1 mg KOH/g, dispersibility of the EVOH (B) in the resin composition (E) is lowered, impact resistance of a molded article to be obtained decreases and adhesiveness of the acid-modified polyolefin (C) to the polyolefin (A) and the EVOH (B) is also lowered. The acid value of the acid-modified polyolefin (C) is suitably 0.5 mg KOH/g or more. Meanwhile, if the acid-modified polyolefin (C) has an acid value of more than 9 mg KOH/g, viscosity matching in resins constituting a multilayer structure before recovery may be deteriorated, leading to an uneven layer thickness of a molded article to be obtained. The acid value of the acid-modified polyolefin (C) is suitably 7 mg KOH/g or less, more suitably 5 mg KOH/g or less, and even more suitably 3 mg KOH/g or less. If the acid-modified polyolefin (C) is a mixture of multiple types of resins, the acid value of the acid-modified polyolefin (C) is determined by weighted averaging acid values of the individual resins with a mixing mass ratio.

The MFR (melt flow rate, 190° C., under a load of 2.16 kg) of the acid-modified polyolefin (C) is suitably from 0.1 to 100 g/10 min. With the MFR of the acid-modified polyolefin (C) within the range, balance between viscosity of the acid-modified polyolefin (C) and viscosities of the polyolefin (A) and the acid-modified polyolefin (D) is improved when the resin composition (E) is produced using a regrind of the multilayer structure having the polyolefin (A) layer and the EVOH (B) layer. Consequently, the dispersibility of the EVOH (B) is further improved and thus a molded article to be produced has further improved impact resistance.

The content of the acid-modified polyolefin (C) in the resin composition (E) is from 0.1 to 20 parts by mass based on 100 parts by mass of the polyolefin (A). If the content of the acid-modified polyolefin (C) is less than 0.1 part by mass, dispersibility of the EVOH (B) in the resin composition (E) decreases, leading to lower impact resistance of a molded article to be obtained. The content is suitably 0.5 parts by mass or more and more suitably 2 parts by mass or more. Meanwhile, if the content of the acid-modified polyolefin (C) is more than 20 parts by mass, impact resistance of a molded article to be obtained may decrease.

Examples of the acid-modified polyolefin (D) contained in the resin composition (E) include a graft-modified polyolefin produced by graft modifying a polyolefin with an acid and an olefinic copolymer produced by copolymerizing olefin with an acid. These may be used alone or in combination of two or more. Among these, the acid-modified polyolefin (D) is suitably a graft-modified polyolefin. In the light of compatibility with the polyolefin (A), the acid-modified polyolefin (D) is preferably obtained by acid modifying the same type of polyolefin as the polyolefin (A) with an acid. For example, when the polyolefin (A) is polypropylene, the acid-modified polyolefin (D) is preferably acid-modified polypropylene. When the polyolefin (A) is polyethylene, the acid-modified polyolefin (D) is preferably acid-modified polyethylene. Furthermore, a total content of α-olefin units in the acid-modified polyolefin (D) is more than 95 mol % or more.

An example of the graft-modified polyolefin used as the acid-modified polyolefin (D) may be that obtained by graft modifying the above polyolefin used as the polyolefin (A) with an acid. The acid used here may be selected from those used for producing the acid-modified polyolefin (C). Among these, a maleic-anhydride graft-modified polyolefin is most suitably used.

The olefinic copolymer used as the acid-modified polyolefin (D) may be that obtained by copolymerizing an acid as a copolymerization component with the above polyolefin used as the polyolefin (A). The acid used here may be selected from those above-described in producing the acid-modified polyolefin (C).

The acid-modified polyolefin (D) has an acid value of more than 10 mg KOH/g and 120 mg KOH/g or less. The acid-modified polyolefin (D) having such a high acid value contained in the resin composition (E) allows reduction of the amount of deteriorated materials adhering to a screw and/or a die even in the case of long-term continuous melt molding of the resin composition (E), as well as improvement in impact resistance of a molded article to be obtained. The acid value of the acid-modified polyolefin (D) is suitably 12 mg KOH/g or more, more suitably 18 mg KOH/g or more, even more suitably 25 mg KOH/g or more, particularly suitably 35 mg KOH/g or more, and most suitably 40 mg KOH/g or more. Meanwhile, the acid value of the acid-modified polyolefin (D) is suitably 100 mg KOH/g or less and more suitably 70 mg KOH/g or less. When the acid-modified polyolefin (D) is a mixture of multiple types of resins, the acid value of the acid-modified polyolefin (D) is determined by weighted averaging acid values of the individual resins with a mixing mass ratio.

The content of the acid-modified polyolefin (D) in the resin composition (E) is from 0.1 to 10 parts by mass based on 100 parts by mass of the polyolefin (A). If the content of the acid-modified polyolefin (D) is less than 0.1 part by mass, the amount of deteriorated materials adhering to a screw and/or a die cannot be reduced and impact resistance of a molded article to be obtained cannot be improved. The content of the acid-modified polyolefin (D) is suitably 0.5 parts by mass or more and more suitably 1 part by mass or more. Meanwhile, if the content of the acid-modified polyolefin (D) is more than 10 parts by mass, the acid-modified polyolefin (D) may excessively react with the EVOH (B), leading to lower thermal stability of the resin composition (E). The content of the acid-modified polyolefin (D) is suitably 8 parts by mass or less.

The MFR (melt flow rate, 190° C., under a load of 2.16 kg) of the acid-modified polyolefin (D) is suitably 5 g/10 min or more. If the MFR of the acid-modified polyolefin (D) is less than 5 g/10 min, fouling on a screw or a die may increase during melt kneading of the resin composition (E) and impact resistance of a molded article to be obtained may decrease. The MFR of the acid-modified polyolefin (D) is more suitably 10 g/10 min or more, even more suitably 15 g/10 min or more, and particularly suitably 20 g/10 min or more. Meanwhile, the MFR of the acid-modified polyolefin (D) is generally 1000 g/10 min or less.

The ratio (D/A) of the MFR (190° C., under a load of 2.16 kg) of the acid-modified polyolefin (D) to the MFR (190° C., under a load of 2.16 kg) of the polyolefin (A) in the resin composition (E) has to be 50 or more. This allows reduction of the amount of deteriorated materials adhering to a screw and/or a die even when long-term continuous melt molding of the resin composition (E) is conducted, as well as improvement in impact resistance of a molded article to be obtained. The ratio (D/A) is suitably 100 or more, more suitably 150 or more, even more suitably 200 or more, particularly suitably 400 or more, and most suitably 500 or more. Meanwhile, the ratio (D/A) is suitably 20000 or less, more suitably 10000 or less, even more suitably 5000 or less, and particularly suitably 2000 or less.

It is suitable that a difference between the acid value of the acid-modified polyolefin (C) and the acid value of the acid-modified polyolefin (D) in the resin composition (E) is 10 mg KOH/g or more. If the acid value difference is less than 10 mg KOH/g, the amount of fouling on a screw and/or a die may increase during melt kneading of the resin composition (E) and impact resistance of a molded article to be obtained may decrease. The difference between the acid value of the acid-modified polyolefin (C) and the acid value of the acid-modified polyolefin (D) is more suitably 15 mg KOH/g or more, even more suitably 20 mg KOH/g or more, particularly suitably 25 mg KOH/g or more, and most suitably 30 mg KOH/g or more.

The resin composition (E) may contain additives other than the polyolefin (A), the EVOH (B), the acid-modified polyolefin (C) and the acid-modified polyolefin (D) as long as they do not inhibit the effects of the present invention. Examples of such an additive include an antioxidant, an ultraviolet absorber, a plasticizer, a lubricant, a filler, and an antistatic. Specific examples of the additives are as described below. The content of such other additives in the resin composition (E) is generally 50% by mass or less, suitably 20% by mass or less, and more suitably 10% by mass or less.

Antioxidant: 2,5-di-t-butylhydroquinone, 2,6-di-t-butyl-p-cresol, 4,4'-thiobis(6-t-butylphenol), 2,2'-methylenebis(4-methyl-6-t-butylphenol), octadecyl-3-(3',5'-di-t-butyl-4'-hydroxyphenyl)propionate, 4,4'-thiobis(6-t-butylphenol), and the like.

Ultraviolet absorber: ethylene-2-cyano-3,3'-diphenyl acrylate, 2-(2'-hydroxy-5'-methylphenyl)benzotriazole, 2-(2'-hydroxy-3'-t-butyl-5'-methylphenyl)5-chlorobenzotriazole, 2-hydroxy-4-m ethoxybenzophenone, 2,2'-dihydroxy-4-methoxybenzophenone, 2-hydroxy-4-octoxybenzophenone, and the like.

Plasticizer: dimethyl phthalate, diethyl phthalate, dioctyl phthalate, wax, liquid paraffin, phosphates, and the like.

Lubricant: stearamide, oleamide, erucamide, behenamide, ethylenebis(stearamide), methylol stearamide, N-oleylpalmitamide, N-stearylerucamide, liquid paraffin, native paraffin, synthetic paraffin, polyolefin wax, stearyl alcohol, lauryl alcohol, stearic acid, lauric acid, myristic acid, behenic acid, montanic acid, stearyl stearate, stearyl laurate, calcium stearate, magnesium stearate, zinc stearate, lead stearate, and the like.

Filler: fiberglass, asbestos, ballastnite, calcium silicate, and the like.

Antistatic: glycerol monofatty acid ester, fatty acid diethanolamide, alkyldiethanolamine, alkylsulfonate salt, alkylbenzenesulfonate, alkyltrimethylammonium salt, alkylbenzyldimethylammonium salt, alkyl betaine, alkylimidazolium betaine, and the like.

Next, there will be described a method for preparing the resin composition (E) of the present invention by mixing the polyolefin (A), the EVOH (B), the acid-modified polyolefin (C) and the acid-modified polyolefin (D), and a method for molding the resin composition (E).

There are no particular restrictions on a mixing method for preparing the resin composition (E), and examples include: a method comprising dry blending the polyolefin (A), the EVOH (B), acid-modified polyolefin (C) and acid-modified polyolefin (D) in one time followed by melt kneading; a method comprising preliminarily melt kneading a portion of the polyolefin (A), the EVOH (B), the acid-modified polyolefin (C) and the acid-modified polyolefin (D) and adding other components followed by melt-kneading; and a method comprising blending a multilayer structure containing some or all of the polyolefin (A), the EVOH (B), the acid-modified polyolefin (C) and the acid-modified polyolefin (D) with other components followed by melt kneading.

A suitable method for preparing the resin composition (E) is a method comprising melt kneading a regrind of a multilayer structure including the polyolefin (A) layer, the EVOH (B) layer and the acid-modified polyolefin (C) layer, and a recycling agent containing the acid-modified polyolefin (D). Here, a regrind of a multilayer structure means a regrind including scraps such as burrs generated during production of a molded article made of the multilayer structure and rejected products during molding. Furthermore, a recycling agent is an additive added when such a regrind is melt kneaded, and herein, is a recycling agent containing the acid-modified polyolefin (D). The content of the acid-modified polyolefin (D) in the recycling agent is suitably from 5 to 100 mass %. The content of the acid-modified polyolefin (D) is more suitably 10 mass % or more, even more preferably 20 mass % or more, and particularly preferably 50 mass % or more.

Among others, a preferred recycling agent comprises a polyolefin (A) and an acid-modified polyolefin (D), wherein a mass ratio (D/A) of the acid-modified polyolefin (D) to the polyolefin (A) is from 0.1 to 10, the polyolefin (A) has an MFR (190° C., under a load of 2.16 kg) from 0.01 to 10 g/10 min, the acid-modified polyolefin (D) has an acid value of more than 10 mg KOH/g and 120 mg KOH/g or less, and a ratio (D/A) of an MFR (190° C., under a load of 2.16 kg) of the acid-modified polyolefin (D) to the MFR (190° C., under a load of 2.16 kg) of the polyolefin (A) is 50 or more. The recycling agent is widely applicable to recover molded articles containing a polyolefin and an EVOH including recovery of a multilayer structure comprising the polyolefin (A) layer, the EVOH (B) layer, and the acid-modified polyolefin (C) layer.

The polyolefin (A) and the acid-modified polyolefin (D) used for the recycling agent can be those described above for the resin composition (E). The mass ratio (D/A) of the acid-modified polyolefin (D) to the polyolefin (A) is from 0.1 to 10. By blending the polyolefin (A) with the acid-modified polyolefin (D) in such a mass ratio, the amount of fouling on a screw and/or a die can be further reduced while melt kneading the recycling agent with a regrind of the multilayer structure including the polyolefin (A) layer, the EVOH (B) layer and the acid-modified polyolefin (C) layer, and impact resistance of a molded article to be obtained is further improved. The mass ratio (D/A) is preferably 0.2 or more, more preferably 0.5 or more, and even more preferably 1 or more.

In the recycling agent, the ratio (D/A) of the MFR (190° C., under a load of 2.16 kg) of the acid-modified polyolefin (D) to the MFR (190° C., under a load of 2.16 kg) of the polyolefin (A) has to be 50 or more. Thus, the amount of fouling on a screw and/or a die can be further reduced while melt kneading the recycling agent with a regrind of the multilayer structure including the polyolefin (A) layer, the EVOH (B) layer and the acid-modified polyolefin (C) layer, and impact resistance of a molded article to be obtained is further improved. The ratio (D/A) is suitably 100 or more, more suitably 150 or more, even more suitably 200 or more, particularly suitably 400 or more, and most suitably 500 or more. Meanwhile, the ratio (D/A) is suitably 20000 or less, more suitably 10000 or less, even more suitably 5000 or less, and particularly suitably 3000 or less.

In the light of compatibility, the polyolefin (A) contained in the recycling agent is preferably the same polyethylene type as the polyolefin (A) contained in the recovered multilayer structure. For example, when the polyolefin (A) contained in the recovered multilayer structure is polypropylene, the polyolefin (A) contained in the recycling agent is preferably polypropylene. When the polyolefin (A) contained in the recovered multilayer structure is polyethylene, the polyolefin (A) contained in the recycling agent is preferably polyethylene.

The total content of the polyolefin (A) and acid-modified polyolefin (D) in the recycling agent is preferably 50 mass % or more, more preferably 70 mass % or more, and even more preferably 80 mass % or more. The recycling agent may contain additives other than the polyolefin (A) and the acid-modified polyolefin (D) as long as they do not inhibit the effects of the present invention. Such additives can be selected from those described above as other additives contained in the resin composition (E).

When the polyolefin (A) and other components are added to the acid-modified polyolefin (D), they are preferably melt kneaded in advance to prepare a resin composition containing all of them, which is then added to the regrind. Such a recycling agent is added to the regrind suitably as pellets. The regrind is preferably pre-pulverized to an appropriate size, and suitably the recycling agent pellets are added to the pulverized regrind.

Starting materials for the resin composition (E) may be only virgin resins, but preferably, a regrind of the multilayer structure is used at least a portion of the starting materials in the light of environmental conservation owing to reduction of the amount of waste materials and the effect of cost reduction. The amount of the regrind in the resin composition (E) is suitably 50 mass % or more.

Furthermore, it is also preferred that the regrind as a starting material for the resin composition (E) consists of a multilayer structure comprising the resin composition (E) layer in addition to the polyolefin (A) layer, the EVOH (B)

layer, and the acid-modified polyolefin (C) layer. That is, it is preferred that a molded article consisting of a multilayer structure comprising the resin composition (E) layer is produced, and then, a regrind of the molded article is used again as a starting material for the resin composition (E) layer in an analogous multilayer structure.

When the resin composition (E) contains components other than the polyolefin (A), the EVOH (B), the acid-modified polyolefin (C) and the acid-modified polyolefin (D), there are no particular restrictions to a method for incorporating these components, and they can be incorporated as described above for each of the (A), (B), (C) and (D) components. When a regrind of the multilayer structure comprising the polyolefin (A) layer, the EVOH (B) layer and the acid-modified polyolefin (C) layer is used for preparation of the resin composition (E), any of the layers in the multilayer structure may contain other components. Alternatively, the recycling agent containing the acid-modified polyolefin (D) may contain other components.

The multilayer structure comprising the resin composition (E) layer, the polyolefin (A) layer, the EVOH (B) layer, and the acid-modified polyolefin (C) layer is a preferred embodiment of the present invention. Exemplary layer structures of such a multilayer structure are as follows.

Five layers: A/C/B/C/E

Six layers: A/C/B/C/E/A, E/NC/B/C/A, A/E/C/B/C/E, E/NC/B/C/E

Seven layers: A/E/C/B/C/E/A, A/E/C/B/C/A/E, E/NC/B/C/A/E

In the multilayer structure, it is suitable that the EVOH (B) layer contacts with the acid-modified polyolefin (C) layer in the light of improvement in interlayer adhesiveness.

A ratio (B/A) of a total thickness of the EVOH (B) layer to a total thickness of the polyolefin (A) layer in the multilayer structure is suitably from 0.5/100 to 20/100. If the thickness ratio (B/A) is less than 0.5/100, barrier properties may be insufficient. Meanwhile, if the thickness ratio (B/A) is more than 20/100, impact resistance may decrease and costs may increase.

A ratio (C/A) of a total thickness of the acid-modified polyolefin (C) layer to the total thickness of the polyolefin (A) layer in the multilayer structure is suitably from 0.5/100 to 20/100. If the thickness ratio (C/A) is less than 0.5/100, interlayer adhesiveness may be insufficient. Meanwhile, if the thickness ratio (C/A) is more than 20/100, viscosity matching in the resins used for producing a multilayer structure may become worse, so that the layer thickness may be uneven during production of the multilayer structure.

A ratio (E/A) of a total thickness of the resin composition (E) layer to the total thickness of the polyolefin (A) layer in the multilayer structure is suitably from 5/100 to 60/100. If the thickness ratio (E/A) is less than 5/100, costs may increase. Meanwhile, if the thickness ratio (E/A) is more than 80/100, impact resistance may decrease.

A total thickness of the multilayer structure may be appropriately determined, depending on its application. The total thickness is suitably from 100 to 8000 μm. With the total thickness of 100 μm or more, a highly rigid multilayer structure can be produced. The total thickness is more suitably 500 μm or more. Meanwhile, with the total thickness of 8000 μm or less, a flexible multilayer structure can be obtained. The total thickness is more suitably 7000 μm or less.

There are no particular restrictions to a method for producing the multilayer structure; examples include molding methods employed in a common polyolefin such as extrusion molding, blow molding, injection molding and thermoforming. Among these, coextrusion molding and coinjection molding are suitable, and coextrusion molding is more suitable.

A preferred embodiment of the resin composition (E) is a fuel container having the resin composition (E) layer. A preferred embodiment of the multilayer structure is a fuel container further having, in addition to the resin composition (E) layer, the polyolefin (A) layer, the EVOH (B) layer, and the acid-modified polyolefin (C) layer. Here, the fuel container preferably comprises the (A) layer or the (E) layer disposed over the inner and outer sides of the (B) layer via the (C) layer. The fuel container comprises the (A) layer or the (E) layer over both sides of the (B) layer as an intermediate layer via the (C) layer.

In the fuel container, a thickness ratio (I/O) is preferably less than 50/50, where a total thickness of the layers positioned inside of the EVOH (B) layer is "I" and a total thickness of the layers positioned outside of the (B) layer is "O". In other words, the EVOH (B) layer is disposed at an inner position based on the total thickness. Here, when there is a layer other than the (A) layer, the (C) layer and the (E) layer in a portion of the inside or the outside, its thickness is added to "I" or "O". In this context, the thickness of each layer in the fuel container of the present invention means an average thickness in the trunk of the fuel container. By disposing the EVOH (B) layer at such a position, gasoline barrier properties and impact resistance are improved in comparison with the case where the layer is disposed in the middle of the whole layer thickness. More preferably, (I/O) 45/55, even more preferably (I/O) 40/60, particularly preferably (I/O) 35/65, and most preferably (I/O) 30/70. Note that the innermost layer is preferably the (A) layer, the (C) layer, or the (E) layer. A preferred method for producing the fuel container by molding is a coextrusion blow molding, but in the method, a cylindrical molten parison has to be cut by a mold followed by bonding. In this situation, a cylindrical opening is closed by bonding such that the innermost layers come in contact with each other. With the innermost layer being the (A) layer, the (C) layer, or the (E) layer, bonding strength of the closed part (pinch-off part) is improved. In this light, preferably (I/O) 1/99, more preferably (I/O) 2/98, particularly preferably (I/O) 5/95, and most preferably (I/O) 10/90.

Furthermore, it is also preferred that a thickness ratio (X/Y) where the thickness of the (B) layer is "X" and the total thickness is "Y" satisfies formula (1):

$$0.005 \leq (X/Y) \leq 0.13 \tag{1}.$$

If (X/Y) is less than 0.005, gasoline barrier properties may be deteriorated. The value of (X/Y) is preferably 0.01 or more and more preferably 0.02 or more. Meanwhile, if (X/Y) is 0.13 or more, impact resistance may decrease, and costs may increase due to the use of a large amount of the EVOH (B). The value of (X/Y) is preferably 0.10 or less and more preferably 0.07 or less.

The following layer structures are preferred for the fuel container of the present invention. In these examples, the left is the inside and the right is the outside.

Five layers: (inside) A/C/B/C/E (outside), E/C/B/C/A

Six layers: A/C/B/C/E/A, A/E/C/B/C/A, E/C/B/C/E/A, A/E/C/B/C/E, E/E/C/B/C/A, A/C/B/C/E/E Seven layers: A/E/C/B/C/E/A, A/E/C/B/C/E/E, E/E/C/B/C/E/A For the resin composition (E) of the present invention, the amount of deteriorated materials adhering to a screw and/or a die is reduced even when long-term continuous melt molding is conducted. Furthermore, use of the resin composition (E) allows production of a molded article of a multilayer structure exhibiting excellent impact resistance and appearance. Such a molded article is preferably used as a food packaging container, a fuel container, and the like.

EXAMPLES

The present invention will be described below further specifically with reference to Examples.

[MFR]

An MFR of a resin was measured in accordance with JIS K 7210.

[Acid Value of Resin]

An acid value of an acid-modified polyolefin was measured in accordance with JIS K 2501, and an acid modification amount (mmol/g) was calculated from the acid value. A solvent used was xylene.

[Impact Resistance of Test Piece]

IZOD impact strength was measured in accordance with JIS K 7110.

Using an injection molding machine (Nissei, FS-80S), resin composition pellets were injection molded to give a molded article (length: 80 mm, width: 10 mm, thickness: 4 mm), which was then notched to obtain a test piece. Using a digital impact tester (Toyo Seiki Seisaku-sho, Ltd.), IZOD impact strength (kJ/m$^2$) of the test piece thus obtained was measured at 23° C. and −40° C.

[Dispersibility]

A cut surface of a resin composition pellet was electron stained and observed by scanning electron microscopy to determine a particle size of the EVOH (B) dispersed in the polyolefin (A).

[Measurement of 50% Failure Height for Fuel Container]

A fuel container was filled with ethylene glycol to 60 volume % based on the inner volume and was stored in a freezer at −40° C. for 3 days. Then, the container was dropped on a concrete, and a drop height at which the bottle was broken (ethylene glycol in the container leaked) was determined. In terms of the failure height, a 50% failure height was determined by a calculation method described in a JIS test method ("8. Calculation" section in K7211) using the test results of n=30.

[Polyolefin (A)]

A1: polypropylene with a density of 0.900 g/cm$^3$ and an MFR (measured at 190° C., under a load of 2.16 kg) of 1 g/10 min A2: high-density polyethylene with a density of 0.945 g/cm$^3$ and an MFR (measured at 190° C., under a load of 2.16 kg) of 0.03 g/10 min

[EVOH (B)]

B1: EVOH with an ethylene content of 32 mol %, a saponification degree of 99.9 mol %, an MFR (190° C., under a load of 2.16 kg) of 1.6 g/10 min, and a density of 1.19 g/cm$^3$

[Acid-Modified Polyolefin (C)]

C1: maleic-anhydride graft-modified polyethylene "ADMER® QF500" [density: 0.900 g/cm$^3$, MFR (measured at 190° C., under a load of 2.16 kg): 1.1 g/10 min, acid value: 1.1 mg KOH/g] from Mitsui Chemicals, Inc.

C2: maleic-anhydride graft-modified polyethylene "ADMER® GT6" [density: 0.92 g/cm$^3$, MFR (measured at 190° C., under a load of 2.16 kg): 1.1 g/10 min, acid value: 1.5 mg KOH/g] from Mitsui Chemicals, Inc.

[Acid-Modified Polyolefin (D)]

D1 to D8: maleic-anhydride graft-modified polypropylenes (D1 to D8) used were obtained by melt kneading polypropylene (PP with a density of 0.91 g/cm$^3$), maleic anhydride (MAn), and 2,5-dimethyl-2,5-bis(t-butylperoxy)hexane (initiator) followed by pelletizing. The acid values and MFRs (measured at 190° C., under a load of 2.16 kg) of the maleic-anhydride graft-modified polypropylenes (D1 to D8) are shown in Table 1.

D9 to D15: maleic-anhydride graft-modified polyethylenes (D9 to D15) used were obtained by melt kneading high-density polyethylene (PE1 with a density of 0.95 g/cm$^3$ or PE2 with a density of 0.93 g/cm$^3$), maleic anhydride (MAn), and 2,5-dimethyl-2,5-bis(t-butylperoxy)hexane followed by pelletizing. The acid values and MFRs (measured at 190° C., under a load of 2.16 kg) of the maleic-anhydride graft-modified polyethylenes (D9 to D15) are shown in Table 2.

Example 1

[Production of Recycling Agent]

25 parts by mass of polypropylene (A1) and 75 parts by mass of maleic-anhydride graft-modified polypropylene (D1) were dry blended and the mixture was melt kneaded using a twin screw extruder (Toyo Seiki Seisaku-sho, Ltd., "2D25W", diameter: 25 mm) at 215° C. and then pelletized using a pelletizer to obtain a recycling agent.

[Evaluation of Long-Run Properties]

Resin composition (E) pellets were produced by dry blending 2.4 parts by mass of the recycling agent thus obtained, 100 parts by mass of polypropylene (A1), 8.6 parts by mass of EVOH (B1), and 10 parts by mass of maleic-anhydride graft-modified polypropylene (C1) and melt kneading the mixture at 215° C. using a single screw extruder (Research Laboratory of Plastics Technology Co., Ltd., "GT-40-26", diameter: 40 mm) followed by pelletization. The melt-kneading conditions of the process are as follows. The resin composition (E) pellets thus obtained were again placed into the same single screw extruder and then melt kneaded under the same conditions and pelletized to obtain resin composition (E) pellets. The process of similarly melt kneading the resin composition (E) pellets thus obtained was repeated three more times. Low-density polyethylene was supplied to the single screw extruder, which was then operated for 15 min. Then, the screw and the die were removed, and a screw fouling and die build-up (fouling on the die) were separately collected and weighed. Furthermore, impact resistance and dispersibility of the resin composition (E) pellets thus obtained (product after repeating melt-kneading five times) were evaluated by the above methods. These results are shown in Table 3.

Screw rotation speed: 95 rpm

Cylinder and die temperature setting: C1/C2/C3/C4/C5/D=200° C./215° C./215° C./215° C./215° C./215° C.

Relationship between the number of repeated melt kneading operations and the amount of die build-up was evaluated. With the number of repeated melt kneading operations being 1 to 4, resin composition (E) pellets were produced and the resin composition (E) pellet produced were repeatedly melt kneaded, and then the amount of die build-up was measured. In the same methods as described above, the resin composition (E) pellets were produced and melt kneaded again and the amount of die build-up were measured. FIG. 1 is a plot of the amount of die build-up vs. the number of repeated melt kneading operations. In this figure, the amount of die build-up after repeating the melt kneading described above five times is also plotted.

Examples 2 and 3

Resin composition (E) pellets were produced and evaluated (except for evaluation of relationship between the number of repeated melt kneading operations and the amount of die build-up) as described in Example 1, except that the amounts of the recycling agent, the EVOH (B), and the acid-modified polyolefin (C) were as shown in Table 3. The results are shown in Table 3.

Examples 4 to 8 and Comparative Examples 1 and 2

Resin composition (E) pellets were produced and evaluated (except for evaluation of relationship between the number of repeated melt kneading operations and the amount of die build-up) as described in Example 1, except that the type of the acid-modified polyolefin (D) was as shown in Table 3. The results are shown in Table 3.

Example 9

Resin composition (E) pellets were produced and evaluated (except for evaluation of relationship between the number of repeated melt kneading operations and the amount of die build-up) as described in Example 1, except that a recycling agent consisting of the acid-modified polyolefin (D) alone was used. The results are shown in Table 3.

Comparative Example 3

Resin composition pellets were produced and evaluated as described in Example 1, substituting polypropylene (A1) alone for the recycling agent. The results are shown in Table 3 and FIG. 1.

Examples 10, 13 to 16, Comparative Examples 4 and 5

Resin composition (E) pellets were produced and evaluated as described in Example 1, except that the types of the polyolefin (A), the acid-modified polyolefin (C), and the acid-modified polyolefin (D) were as shown in Table 4. The relationship between the number of repeated melt kneading operations and the amount of die build-up was evaluated only in Example 10. The results are shown in Table 4 and FIG. 2.

Examples 11 and 12

Resin composition (E) pellets were produced and evaluated (except for evaluation of relationship between the number of repeated melt kneading operations and the amount of die build-up) as described in Example 10, except that the amounts of the recycling agent, the EVOH (B), and the acid-modified polyolefin (C) were as shown in Table 4. The results are shown in Table 4.

Example 17

Resin composition (E) pellets were produced and evaluated (except for evaluation of relationship between the number of repeated melt kneading operations and the amount of die build-up) as described in Example 10, except that a recycling agent consisting of the acid-modified polyolefin (D) alone was used. The results are shown in Table 4.

Comparative Example 6

Resin composition pellets were produced and evaluated as described in Example 10, substituting high-density polyethylene (A2) alone for the recycling agent. The results are shown in Table 4 and FIG. 2.

TABLE 1

|  |  | D1 | D2 | D3 | D4 | D5 | D6 | D7 | D8 |
|---|---|---|---|---|---|---|---|---|---|
| Mixing ratio (parts by mass) | PP | 100 | 100 | 100 | 100 | 100 | 100 | 100 | 100 |
|  | MAn | 2 | 1 | 2 | 4 | 1 | 2 | 0.2 | 0.1 |
|  | Initiator | 0.06 | 0.03 | 0.09 | 0.12 | 0.04 | 0.06 | 0.03 | 0.03 |
| MFR (g/10 min) |  | >500 | >500 | >500 | >500 | >500 | >500 | >500 | >500 |
| Acid value (mg KOH/g) |  | 45 | 16 | 56 | 104 | 23 | 47 | 4.5 | 1.9 |

TABLE 2

|  |  | D9 | D10 | D11 | D12 | D13 | D14 | D15 |
|---|---|---|---|---|---|---|---|---|
| Mixing ratio (parts by mass) | PE1 | 100 | 100 | 100 | — | 100 | 100 | 100 |
|  | PE2 | — | — | — | 100 | — | — | — |
|  | MAn | 3 | 1 | 1 | 1 | 2 | 0.5 | 0.1 |
|  | Initiator | 0.1 | 0.02 | 0.03 | 0.03 | 0.03 | 0.03 | 0.03 |
| MFR (g/10 min) |  | 25 | 14 | 23 | 470 | 7 | 1.8 | 1.1 |
| Acid value (mg KOH/g) |  | 47 | 14 | 16 | 15 | 31 | 9 | 1.5 |

TABLE 3

|  |  |  | Unit | Example 1 | Example 2 | Example 3 |
|---|---|---|---|---|---|---|
| Recycling agent | Acid-modified PO (D) | Type | — | D1 | D1 | D1 |
|  |  | Acid value | mg KOH/g | 45 | 45 | 45 |
|  |  | MFR | g/10 min | >500 | >500 | >500 |

TABLE 3-continued

| | | | | | | |
|---|---|---|---|---|---|---|
| | | Content | parts by mass | 75 | 75 | 75 |
| | PO (A) | Type | — | A1 | A1 | A1 |
| | | MFR | g/10 min | 1 | 1 | 1 |
| | | Content | parts by mass | 25 | 25 | 25 |
| | MFR ratio (D/A) | | — | >500 | >500 | >500 |
| Resin composition (E) | Recycling agent | Amount | parts by mass | 2.4 | 1 | 10 |
| | PO (A) | Type | — | A1 | A1 | A1 |
| | | MFR | g/10 min | 1 | 1 | 1 |
| | | Content | parts by mass | 100 | 100 | 100 |
| | EVOH (B) | Type | — | B1 | B1 | B1 |
| | | Content | parts by mass | 8.6 | 1 | 15 |
| | Acid-modified PO (C) | Type | — | C1 | C1 | C1 |
| | | Acid value | mg KOH/g | 1.1 | 1.1 | 1.1 |
| | | Content | parts by mass | 10 | 1 | 15 |
| | MFR ratio (D/A) | | — | >500 | >500 | >500 |
| Evaluation | Amount of die build-up | | mg | 0 | 0 | 40 |
| | Amount of screw fouling | | mg | 2.8 | 1.2 | 5 |
| | Dispersibility | | um | 0.22 | 0.19 | 0.25 |
| | Impact strength (23° C.) | | kJ/m² | 32 | 33 | 29 |
| | Impact strength (−40° C.) | | kJ/m² | 10 | 11 | 7 |

| | | | Unit | Example 4 | Example 5 | Example 6 |
|---|---|---|---|---|---|---|
| Recycling agent | Acid-modified PO (D) | Type | — | D2 | D3 | D4 |
| | | Acid value | mg KOH/g | 16 | 56 | 104 |
| | | MFR | g/10 min | >500 | >500 | >500 |
| | | Content | parts by mass | 75 | 75 | 75 |
| | PO (A) | Type | — | A1 | A1 | A1 |
| | | MFR | g/10 min | 1 | 1 | 1 |
| | | Content | parts by mass | 25 | 25 | 25 |
| | MFR ratio (D/A) | | — | >500 | >500 | >500 |
| Resin composition (E) | Recycling agent | Amount | parts by mass | 2.4 | 2.4 | 2.4 |
| | PO (A) | Type | — | A1 | A1 | A1 |
| | | MFR | g/10 min | 1 | 1 | 1 |
| | | Content | parts by mass | 100 | 100 | 100 |
| | EVOH (B) | Type | — | B1 | B1 | B1 |
| | | Content | parts by mass | 8.6 | 8.6 | 8.6 |
| | Acid-modified PO (C) | Type | — | C1 | C1 | C1 |
| | | Acid value | mg KOH/g | 1.1 | 1.1 | 1.1 |
| | | Content | parts by mass | 10 | 10 | 10 |
| | MFR ratio (D/A) | | — | >500 | >500 | >500 |
| Evaluation | Amount of die build-up | | mg | 670 | 50 | 20 |
| | Amount of screw fouling | | mg | 15 | 2.2 | 11 |
| | Dispersibility | | um | 0.3 | 0.2 | 0.22 |
| | Impact strength (23° C.) | | kJ/m² | 21 | 29 | 33 |
| | Impact strength (−40° C.) | | kJ/m² | 5 | 11 | 13 |

| | | | Unit | Example 7 | Example 8 | Example 9 |
|---|---|---|---|---|---|---|
| Recycling agent | Acid-modified PO (D) | Type | — | D5 | D6 | D1 |
| | | Acid value | mg KOH/g | 23 | 47 | 45 |
| | | MFR | g/10 min | >500 | >500 | >500 |
| | | Content | parts by mass | 75 | 75 | 75 |

TABLE 3-continued

|  |  |  | Unit |  |  |  |
|---|---|---|---|---|---|---|
| Resin composition (E) | PO (A) | Type | — | A1 | A1 | — |
|  |  | MFR | g/10 min | 1 | 1 | — |
|  |  | Content | parts by mass | 25 | 25 | — |
|  | MFR ratio (D/A) |  | — | >500 | >500 | — |
|  | Recycling agent | Amount | parts by mass | 2.4 | 2.4 | 2.4 |
|  | PO (A) | Type | — | A1 | A1 | A1 |
|  |  | MFR | g/10 min | 1 | 1 | 1 |
|  |  | Content | parts by mass | 100 | 100 | 100 |
|  | EVOH (B) | Type | — | B1 | B1 | B1 |
|  |  | Content | parts by mass | 8.6 | 8.6 | 8.6 |
|  | Acid-modified PO (C) | Type | — | C1 | C1 | C1 |
|  |  | Acid value | mg KOH/g | 1.1 | 1.1 | 1.1 |
|  |  | Content | parts by mass | 10 | 10 | 10 |
| Evaluation | MFR ratio (D/A) |  | — | >500 | >500 | >500 |
|  | Amount of die build-up |  | mg | 310 | 10 | 30 |
|  | Amount of screw fouling |  | mg | 13 | 2.6 | 3.7 |
|  | Dispersibility |  | um | 0.27 | 0.22 | 0.25 |
|  | Impact strength (23° C.) |  | kJ/m² | 24 | 27 | 27 |
|  | Impact strength (−40° C.) |  | kJ/m² | 6 | 6 | 7 |

|  |  |  | Unit | Comparative Example 1 | Comparative Example 2 | Comparative Example 3 |
|---|---|---|---|---|---|---|
| Recycling agent | Acid-modified PO (D) | Type | — | D7 | D8 | — |
|  |  | Acid value | mg KOH/g | 4.5 | 1.9 | — |
|  |  | MFR | g/10 min | 25 | 5.8 | — |
|  |  | Content | parts by mass | 75 | 75 | — |
|  | PO (A) | Type | — | A1 | A1 | A1 |
|  |  | MFR | g/10 min | 1 | 1 | 1 |
|  |  | Content | parts by mass | 25 | 25 | 100 |
|  | MFR ratio (D/A) |  | — | 25 | 6 | — |
| Resin composition (E) | Recycling agent | Amount | parts by mass | 2.4 | 2.4 | 2.4 |
|  | PO (A) | Type | — | A1 | A1 | A1 |
|  |  | MFR | g/10 min | 1 | 1 | 1 |
|  |  | Content | parts by mass | 100 | 100 | 100 |
|  | EVOH (B) | Type | — | B1 | B1 | B1 |
|  |  | Content | parts by mass | 8.6 | 8.6 | 8.6 |
|  | Acid-modified PO (C) | Type | — | C1 | C1 | C1 |
|  |  | Acid value | mg KOH/g | 1.1 | 1.1 | 1.1 |
|  |  | Content | parts by mass | 10 | 10 | 10 |
| Evaluation | MFR ratio (D/A) |  | — | 25 | 6 | — |
|  | Amount of die build-up |  | mg | 1100 | 980 | 1200 |
|  | Amount of screw fouling |  | mg | 24 | 26 | 25 |
|  | Dispersibility |  | um | 0.4 | 0.41 | 0.43 |
|  | Impact strength (23° C.) |  | kJ/m² | 5 | 5 | 5 |
|  | Impact strength (−40° C.) |  | kJ/m² | 2 | 3 | 2 |

TABLE 4

|  |  |  | Unit | Example 10 | Example 11 | Example 12 |
|---|---|---|---|---|---|---|
| Recycling agent | Acid-modified PO (D) | Type | — | D9 | D9 | D9 |
|  |  | Acid value | mg KOH/g | 47 | 47 | 47 |
|  |  | MFR | g/10 min | 25 | 25 | 25 |
|  |  | Content | parts by mass | 75 | 75 | 75 |
|  | PO (A) | Type | — | A2 | A2 | A2 |
|  |  | MFR | g/10 min | 0.03 | 0.03 | 0.03 |
|  |  | Content | parts by mass | 25 | 25 | 25 |
|  | MFR ratio (D/A) |  | — | 833 | 833 | 833 |
| Resin composition (E) | Recycling agent | Amount | parts by mass | 2.4 | 1 | 10 |
|  | PO (A) | Type | — | A2 | A2 | A2 |
|  |  | MFR | g/10 min | 0.03 | 0.03 | 0.03 |
|  |  | Content | parts by mass | 100 | 100 | 100 |
|  | EVOH (B) | Type | — | B1 | B1 | B1 |
|  |  | Content | parts by mass | 8.6 | 1 | 15 |
|  | Acid-modified PO (C) | Type | — | C2 | C2 | C2 |
|  |  | Acid value | mg KOH/g | 1.5 | 1.5 | 1.5 |
|  |  | Content | parts by mass | 10 | 1 | 15 |
|  | MFR ratio (D/A) |  | — | 833 | 833 | 833 |
| Evaluation | Amount of die build-up |  | mg | 370 | 210 | 450 |
|  | Amount of screw fouling |  | mg | 0 | 0 | 10 |
|  | Dispersibility |  | um | 0.17 | 0.15 | 0.21 |
|  | Impact strength (23° C.) |  | kJ/m² | 83 | 83 | 76 |
|  | Impact strength (−40° C.) |  | kJ/m² | 46 | 47 | 41 |

|  |  |  | Unit | Example 13 | Example 14 | Example 15 |
|---|---|---|---|---|---|---|
| Recycling agent | Acid-modified PO (D) | Type | — | D10 | D11 | D12 |
|  |  | Acid value | mg KOH/g | 14 | 16 | 15 |
|  |  | MFR | g/10 min | 14 | 23 | 470 |
|  |  | Content | parts by mass | 75 | 75 | 75 |
|  | PO (A) | Type | — | A2 | A2 | A2 |
|  |  | MFR | g/10 min | 0.03 | 0.03 | 0.03 |
|  |  | Content | parts by mass | 25 | 25 | 25 |
|  | MFR ratio (D/A) |  | — | 467 | 767 | 15667 |
| Resin composition (E) | Recycling agent | Amount | parts by mass | 2.4 | 2.4 | 2.4 |
|  | PO (A) | Type | — | A2 | A2 | A2 |
|  |  | MFR | g/10 min | 0.03 | 0.03 | 0.03 |
|  |  | Content | parts by mass | 100 | 100 | 100 |
|  | EVOH (B) | Type | — | B1 | B1 | B1 |
|  |  | Content | parts by mass | 8.6 | 8.6 | 8.6 |
|  | Acid-modified PO (C) | Type | — | C2 | C2 | C2 |
|  |  | Acid value | mg KOH/g | 1.5 | 1.5 | 1.5 |
|  |  | Content | parts by mass | 10 | 10 | 10 |
|  | MFR ratio (D/A) |  | — | 467 | 767 | 15667 |
| Evaluation | Amount of die build-up |  | mg | 480 | 490 | 530 |
|  | Amount of screw fouling |  | mg | 22 | 29 | 31 |
|  | Dispersibility |  | um | 0.23 | 0.22 | 0.24 |
|  | Impact strength (23° C.) |  | kJ/m² | 45 | 42 | 41 |
|  | Impact strength (−40° C.) |  | kJ/m² | 31 | 29 | 27 |

TABLE 4-continued

|  |  | Unit | Example 16 | Example 17 | Comparative Example 4 |
|---|---|---|---|---|---|
| Recycling agent | Acid-modified PO (D) Type | — | D13 | D9 | D14 |
|  | Acid value | mg KOH/g | 31 | 47 | 9 |
|  | MFR | g/10 min | 13.0 | 25 | 1.8 |
|  | Content | parts by mass | 75 | 75 | 75 |
|  | PO (A) Type | — | A2 | — | A2 |
|  | MFR | g/10 min | 0.03 | — | 0.03 |
|  | Content | parts by mass | 25 | — | 25 |
|  | MFR ratio (D/A) | — | 233 | — | 60 |
| Resin composition (E) | Recycling agent Amount | parts by mass | 2.4 | 2.4 | 2.4 |
|  | PO (A) Type | — | A2 | A2 | A2 |
|  | MFR | g/10 min | 0.03 | 0.03 | 0.03 |
|  | Content | parts by mass | 100 | 100 | 100 |
|  | EVOH (B) Type | — | B1 | B1 | B1 |
|  | Content | parts by mass | 8.6 | 8.6 | 8.6 |
|  | Acid-modified PO (C) Type | — | C2 | C2 | C2 |
|  | Acid value | mg KOH/g | 1.5 | 1.5 | 1.5 |
|  | Content | parts by mass | 10 | 10 | 10 |
|  | MFR ratio (D/A) | — | 233 | 833 | 60 |
| Evaluation | Amount of die build-up | mg | 290 | 470 | 830 |
|  | Amount of screw fouling | mg | 14 | 11 | 45 |
|  | Dispersibility | um | 0.21 | 0.21 | 0.24 |
|  | Impact strength (23° C.) | kJ/m$^2$ | 83 | 74 | 34 |
|  | Impact strength (−40° C.) | kJ/m$^2$ | 49 | 33 | 21 |

|  |  | Unit | Comparative Example 5 | Comparative Example 6 |
|---|---|---|---|---|
| Recycling agent | Acid-modified PO (D) Type | — | D15 | — |
|  | Acid value | mg KOH/g | 1.5 | — |
|  | MFR | g/10 min | 1.1 | — |
|  | Content | parts by mass | 75 | — |
|  | PO (A) Type | — | A2 | A2 |
|  | MFR | g/10 min | 0.03 | 0.03 |
|  | Content | parts by mass | 25 | 100 |
|  | MFR ratio (D/A) | — | 37 | — |
| Resin composition (E) | Recycling agent Amount | parts by mass | 2.4 | 2.4 |
|  | PO (A) Type | — | A2 | A2 |
|  | MFR | g/10 min | 0.03 | 0.03 |
|  | Content | parts by mass | 100 | 100 |
|  | EVOH (B) Type | — | B1 | B1 |
|  | Content | parts by mass | 8.6 | 8.6 |
|  | Acid-modified PO (C) Type | — | C2 | C2 |
|  | Acid value | mg KOH/g | 1.5 | 1.5 |
|  | Content | parts by mass | 10 | 10 |
|  | MFR ratio (D/A) | — | 37 | — |
| Evaluation | Amount of die build-up | mg | 820 | 880 |
|  | Amount of screw fouling | mg | 44 | 48 |
|  | Dispersibility | um | 0.27 | 0.28 |
|  | Impact strength (23° C.) | kJ/m$^2$ | 35 | 30 |
|  | Impact strength (−40° C.) | kJ/m$^2$ | 20 | 17 |

For the resin composition (E, Examples 1 to 17) of the present invention comprising the acid-modified polyolefin (C) having an acid value from 0.1 to 9 mg KOH/g and the acid-modified polyolefin (D) having an acid value of more than 10 mg KOH/g and 120 mg KOH/g or less, in which the ratio (D/A) of the MFR of the acid-modified polyolefin (D) to the MFR of the polyolefin (A) is 50 or more, the amount of die build-up and the amount of screw fouling were small, the EVOH (B) exhibited excellent dispersibility, and the molded article obtained had higher impact strength. In contrast, all of the above performances were insufficient for the resin composition (Comparative Examples 1, 2, and 5) comprising the acid-modified polyolefin (C) and an acid-modified polyolefin having an acid value of less than 10 mg KOH/g, in which the MFR ratio (D/A) was less than 50; the resin composition (Comparative Example 4) comprising the acid-modified polyolefin (C) and an acid-modified polyolefin having an acid value of less than 10 mg KOH/g; and the resin composition (Comparative Examples 3 and 6) comprising the acid-modified polyolefin (C) alone as the acid-modified polyolefin.

As shown in FIG. 1, when the resin composition (Comparative Example 3) comprising maleic-anhydride graft-modified polypropylene (C1) alone as the acid-modified polyolefin was repeatedly melt kneaded, the amount of die build-up increased with an increase in the number of repeated melt kneading operations. In contrast, when the resin composition (E, Example 1) of the present invention comprising, in addition to (C1), the maleic-anhydride graft-modified polypropylene (D1) having an acid value of 45 mg KOH/g was repeatedly melt kneaded, no die build-up was surprisingly found even after the melt kneading was repeated.

Figure 2:
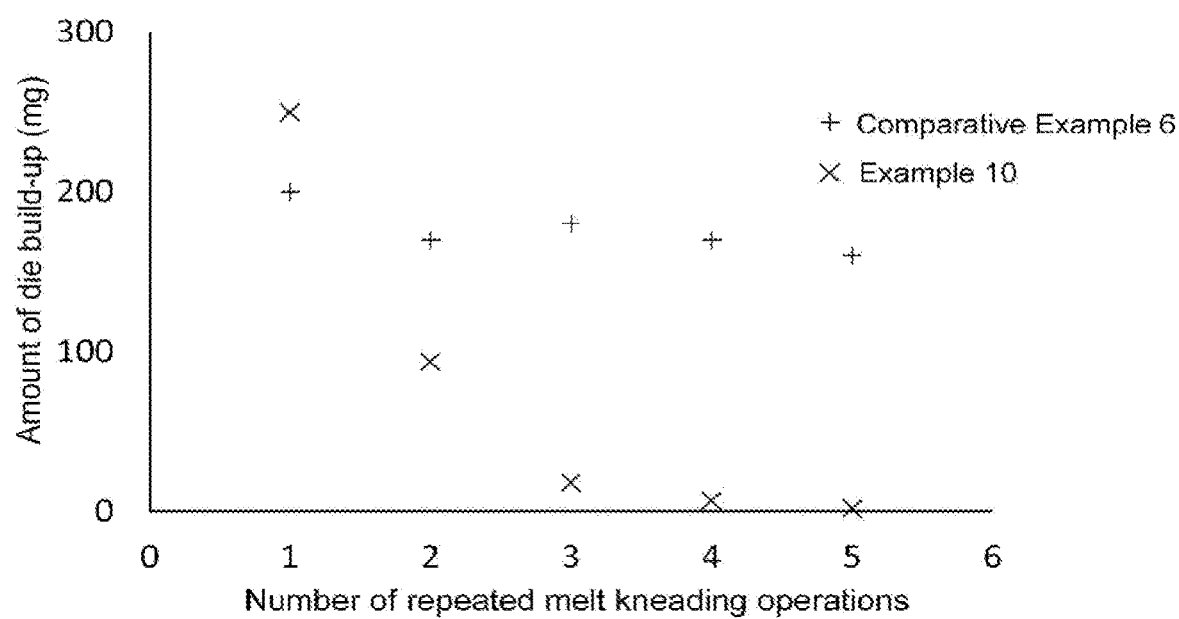
FIG. 2 is a plot of the amount of die build-up vs. the number of repeated melt kneading operations in Example 10 and Comparative Example 6.

As shown in FIG. 2, when the resin composition (Comparative Example 6) comprising maleic-anhydride graft-modified polyethylene (C2) alone as the acid-modified polyolefin was repeatedly melt kneaded, a certain amount of die build-up adhered irrespective of the number of repeated operations. In contrast, when the resin composition (E, Example 10) of the present invention comprising, in addition to (C2), the maleic-anhydride graft-modified polyethylene (D9) having an acid value of 47 mg KOH/g was repeatedly melt kneaded, the amount of adhered die build-up surprisingly decreased with an increase in the number of repeated operations.

Example 18

[Production of Recovered Material]

Using polypropylene (A1), EVOH (B1), and maleic-anhydride graft-modified polypropylene (C1), a three-material five-layered multilayer film (A1: 208 µm/C1: 16 µm/B1: 32 µm/C1: 16 µm/A1: 208 µm) was produced under the following conditions.

Polypropylene (A1)
Extruder: 32 mmφ extruder GT-32-A (Research Laboratory of Plastics Technology Co., Ltd.)
Extrusion temperature: supply section/compression section/metering section/die=170/210/220/220° C.
Die: 300 mm width coat hanger die (Research Laboratory of Plastics Technology Co., Ltd.)
EVOH (B)
Extruder: 20 mmφ extruder Labo type ME CO-EXT (Toyo Seiki Seisaku-sho, Ltd.)
Extrusion temperature: supply section/compression section/metering section/die=180/210/220/220° C.
Die: 300 mm width coat hanger die (Research Laboratory of Plastics Technology Co., Ltd.)
Maleic-Anhydride Graft-Modified Polypropylene (C1)
Extruder: 20 mmφ extruder SZW20GT-20MG-STD (Technovel Corporation)
Extrusion temperature: supply section/compression section/metering section/die=170/210/220/220° C.
Die: 300 mm width coat hanger die (Research Laboratory of Plastics Technology Co., Ltd.)

The multilayer film thus obtained was pulverized by an 8 mmφ diameter-mesh pulverizer to provide a regrind. The mass ratio in the regrind thus obtained was A1/B1/C1=100/10.2/7.8.

[Production of Multilayer Film]

A mixed resin was produced by dry blending 118.6 parts by mass of the regrind thus obtained and 2.4 parts by mass of the recycling agent obtained in Example 1. Using the mixed resin thus obtained, polypropylene (A1), EVOH(B1), and maleic-anhydride graft-modified polypropylene (C1), a four-material six-layer multilayer film (A1: 208 µm/mixed resin [resin composition (E)]: 320 µm/C1: 16 µm/B1: 32 µm/C1: 16 µm/A1: 208 µm) was produced. Here, polypropylene (A1), EVOH (B), and maleic-anhydride graft-modified polypropylene (C1) were molded under the same conditions as those for producing the above regrind, and the mixed resin [resin composition (E) layer] was molded under the following conditions.

Extruder: 32 mmφ extruder GT-32-A (Research Laboratory of Plastics Technology Co., Ltd.)
Extrusion temperature: supply section/compression section/metering section/die=170/210/220/220° C.
Die: 300 mm width coat hanger die (Research Laboratory of Plastics Technology Co., Ltd.)

Multilayer films were continuously produced, and an appearance of a multilayer film obtained after 100 hours was evaluated in accordance with the following criteria. The results are shown in Table 5.

A: Stripes were observed in the multilayer film.
B: No stripes were observed in the multilayer film.

Example 19

A multilayer film was produced and evaluated as described in Example 18, substituting high-density polyethylene (A2) for polypropylene (A1), substituting maleic-anhydride graft-modified polyethylene (C2) for maleic-anhydride graft-modified polypropylene (C1), and substituting maleic-anhydride graft-modified polyethylene (D9) for maleic-anhydride graft-modified polypropylene (D1). The results are shown in Table 5.

Comparative Example 7

A multilayer film was produced and evaluated as described in Example 18, substituting polypropylene (A1) alone for the recycling agent. The results are shown in Table 5.

Comparative Example 8

A multilayer film was produced and evaluated as described in Example 19, substituting high-density polyethylene (A2) alone for the recycling agent. The results are shown in Table 5.

TABLE 5

| | | | Unit | Example 18 | Example 19 | Comparative Example 7 | Comparative Example 8 |
|---|---|---|---|---|---|---|---|
| Resin composition (E) | Regrind | PO (A) | — | A1 | A2 | A1 | A2 |
| | | Thickness ratio | % | 52 | 52 | 52 | 52 |
| | | EVOH (B) | — | B1 | B1 | B1 | B1 |
| | | Thickness ratio | % | 4 | 4 | 4 | 4 |
| | | Acid-modified PO (C) | — | C1 | C2 | C1 | C2 |
| | | Thickness ratio | % | 4 | 4 | 4 | 4 |
| | Recycling agent | Type | — | A1 | A2 | A1 | A2 |
| | | Content | parts by mass | 25 | 25 | 100 | 100 |
| | | Type | — | D1 | D9 | — | — |
| | | Content | parts by mass | 75 | 75 | — | — |
| | Mass ratio (Regrind/Recycling agent) | | — | 118/2.4 | 117.2/2.4 | 118/2.4 | 117.2/2.4 |
| Multilayer structure | PO (A) layer | Type | — | A1 | A2 | A1 | A2 |
| | | Thickness ratio | % | 52 | 52 | 52 | 52 |
| | EVOH (B) layer | Type | — | B1 | B1 | B1 | B1 |
| | | Thickness ratio | % | 4 | 4 | 4 | 4 |
| | Acid-modified PO (C) layer | Type | — | C1 | C2 | C1 | C2 |
| | | Thickness ratio | % | 4 | 4 | 4 | 4 |
| | Resin composition layer | Thickness ratio | % | 40 | 40 | 40 | 40 |
| Evaluation | | Stripes | — | A | A | B | B |

Example 20

Using A2 as the polyolefin (A), B1 as the EVOH (B), maleic-anhydride graft-modified polyethylene (C2) as the acid-modified polyethylene (C), and the resin composition (E) pellets in Example 10 (produced by repeatedly melt kneading five times) as the regrind, a four-material six-layer parison having a layer structure of (inside) A/C/B/C/E/A (outside) was extruded at 210° C. by a extrusion blow molding machine "TB-ST-6P" from Suzuki Seikosho; blown in a mold at 15° C.; and then cooled for 20 sec to form a 500 mL fuel container (bottom diameter: 100 mm, height: 64 mm) with a total layer thickness of 2050 μm [(inside) A/C/B/C/E/A (outside)=350/50/50/50/850/700 μm]. The fuel container thus formed was used for evaluation of a 50% failure height. The evaluation results are shown in Table 6.

Example 21

A fuel container was formed and evaluated for a 50% failure height as described in Example 20, except that the layer structure was (inside) A/C/E/C/B/A (outside)=350/50/850/50/50/700 μm. The evaluation results are shown in Table 6.

Comparative Examples 9 and 10

A fuel container was formed and evaluated for a 50% failure height as described in Example 20, substituting the resin composition in Comparative Example 4 or 5 for the resin composition (E) in Example 10. The evaluation results are shown in Table 6.

TABLE 6

| | | | Unit | Example 20 | Example 21 | Comparative Example 9 | Comparative Example 10 |
|---|---|---|---|---|---|---|---|
| Fuel Container | PO (A) layer | Type | — | A2 | A2 | A2 | A2 |
| | EVOH (B) layer | Type | — | B1 | B1 | B1 | B1 |
| | Acid-Modified PO (C) layer | Type | — | C2 | C2 | C2 | C2 |
| | Resin composition (E) layer | Type | — | Example 10 | Example 10 | Comparative Example 4 | Comparative Example 5 |
| | Thickness ratio (I/O) | | — | 4 | 1 | 4 | 4 |
| | Thickness ratio (X/Y) | | — | 0.024 | 0.024 | 0.024 | 0.024 |
| Evaluation | | 50% failure height | — | 2.1 | 1.7 | 1.1 | 0.8 |

The invention claimed is:

1. A resin composition (E) comprising from 0.1 to 20 parts by mass of an ethylene-vinyl alcohol copolymer (B), from 0.1 to 20 parts by mass of an acid-modified polyolefin (C), and from 0.1 to 10 parts by mass of an acid-modified polyolefin (D) based on 100 parts by mass of a polyolefin (A), wherein
the polyolefin (A) has an MFR (190° C., under a load of 2.16 kg) from 0.01 to 10 g/10 min,
the acid-modified polyolefin (C) has an acid value from 0.1 to 9 mg KOH/g,
the acid-modified polyolefin (D) has an acid value of more than 10 mg KOH/g and 120 mg KOH/g or less, and
a ratio (D/A) of an MFR (190° C., under a load of 2.16 kg) of the acid-modified polyolefin (D) to the MFR (190° C., under a load of 2.16 kg) of the polyolefin (A) is 50 or more.

2. A method for producing the resin composition (E) according to claim 1, comprising: melt kneading a regrind of a multilayer structure comprising a layer of the polyolefin (A), a layer of the ethylene-vinyl alcohol copolymer (B), and a layer of the acid-modified polyolefin (C); and a recycling agent containing the acid-modified polyolefin (D).

3. A multilayer structure comprising: a layer of the resin composition (E) according to claim 1; a layer of the polyolefin (A); a layer of the ethylene-vinyl alcohol copolymer (B); and a layer of the acid-modified polyolefin (C).

4. A fuel container comprising a layer of the resin composition (E) according to claim 1.

5. The fuel container according to claim 4, further comprising: a layer of the polyolefin (A); a layer of the ethylene-vinyl alcohol copolymer (B); and a layer of the acid-modified polyolefin (C), wherein
the (A) layer or a layer of the resin composition (E) is disposed over the inner and outer sides of the (B) layer via the (C) layer.

6. The fuel container according to claim 5, wherein
a thickness ratio (I/O) is less than 50/50, where a total thickness of the layers positioned inside of the layer of the ethylene-vinyl alcohol copolymer (B) is "I" and a total thickness of the layers positioned outside of the (B) layer is "O", and
a thickness ratio (X/Y) satisfies a formula (1) below, where a thickness of the (B) layer is "X" and an entire thickness is "Y":

$$0.005 \leq (X/Y) \leq 0.13 \tag{1}.$$

* * * * *